Dec. 25, 1956  R. H. BREEBACK  2,775,269
FILLING MACHINES

Filed Feb. 12, 1954  10 Sheets-Sheet 1

Fig. 1.

INVENTOR:

Rudolph H. Breeback,
BY
ATTORNEYS.

Fig. 3.

Dec. 25, 1956  R. H. BREEBACK  2,775,269
FILLING MACHINES

Filed Feb. 12, 1954  10 Sheets-Sheet 10

INVENTOR:
Rudolph H. Breeback,
BY
ATTORNEYS.

United States Patent Office 2,775,269
Patented Dec. 25, 1956

2,775,269

FILLING MACHINES

Rudolph H. Breeback, Baltimore, Md., assignor to Crown Cork & Seal Company, Inc., Baltimore, Md., a corporation of New York Application February 12, 1954, Serial No. 409,805

26 Claims. (Cl. 141—99)

The present invention relates to filling machines and, more particularly, to beverage filling machines.

The filling of containers with various substances is accomplished by delivering the containers to a rotary filling table where they are supported beneath filling nozzles or heads, this being the practice customarily followed in the filling of containers with beer or other carbonated beverages. In any such filling procedure, the output of filled containers largely depends upon the number of containers which at any given moment are in process of being filled on the rotary filling table. Because it heretofore has been the practice to position the containers in a single circular series on the rotary filling table, all previous efforts to increase the output of filled containers per minute have been largely related to increasing the number of filling heads in the circular series, with a consequent increase in the diameter of the table.

An object of the present invention is to provide a filling machine including a rotary filling table and including means to fill a plurality of circular rows of containers supported on the table.

In connection with the above-stated object, it is to be noted that previously constructed beverage filling machines capable of an optimum output of filled cans or bottles have included sixty filling heads supported on a rotary filling table having a pitch diameter of the order of six-and-a-half feet. Assuming that such a filler has an output of three hundred twelve ounce cans per minute, in order to provide sufficient filling heads in a single circular row to obtain an output of six hundred cans per minute, the rotary filling table would require a pitch diameter of the order of eleven feet. This would require a tremendous increase in the floor space requirements as well as tremendous structural reinforcement of the rotary filling table. With respect to structural reinforcement of the filling table, while the weight of the containers being filled is not substantial and would not greatly increase the load upon the filling table, nevertheless, because of the various parts supported upon and moving with the filling table and the pressure required to hold containers sealed to the filling heads, any increase in the diameter of the filling table requires an increase in the radial bracing of the table and resultant increase in its weight and that of the entire machine.

Another object of the invention is the provision of means to deliver containers to a rotary filling table in two rows and in such manner as to enable a maximum number of filling heads to be engaged in the filling operation at any given moment.

In delivering or removing two rows of containers from a rotary filling machine it is desirable to so arrange the container infeed and outfeed means that, at any given moment, a minimum number of filling heads will be in the zone of table travel in which the container infeed and outfeed means are positioned. For example, by the best practise, a sixty head filler provided with a single circular series of filling heads may have its container infeed and outfeed means so laid out that at any given moment only about six filling heads will be within the infeed and outfeed zone. That is, about fifty-four filling heads will have containers beneath them at any given moment, though only about fifty actually will be receiving liquid. As indicated by the last-stated object, the present invention involves infeeding and outfeeding containers in such manner that the number of filling heads within the infeed and outfeed zone will be held at a minimum.

Still another object of the invention is the provision of filling heads and container supporting platforms of dual type with each platform supporting two or more containers on a line extending radially of the filling table.

Other objects and advantages of the invention will be apparent from the following specification and accompanying drawings.

In the drawings:

Figures 1 to 6 illustrate a beverage filling machine particularly designed for the handling of bottles. As is hereinafter explained, the machine of Figures 7 to 12 primarily is intended for the filling of cans with a carbonated beverage such as beer.

Figure 1:
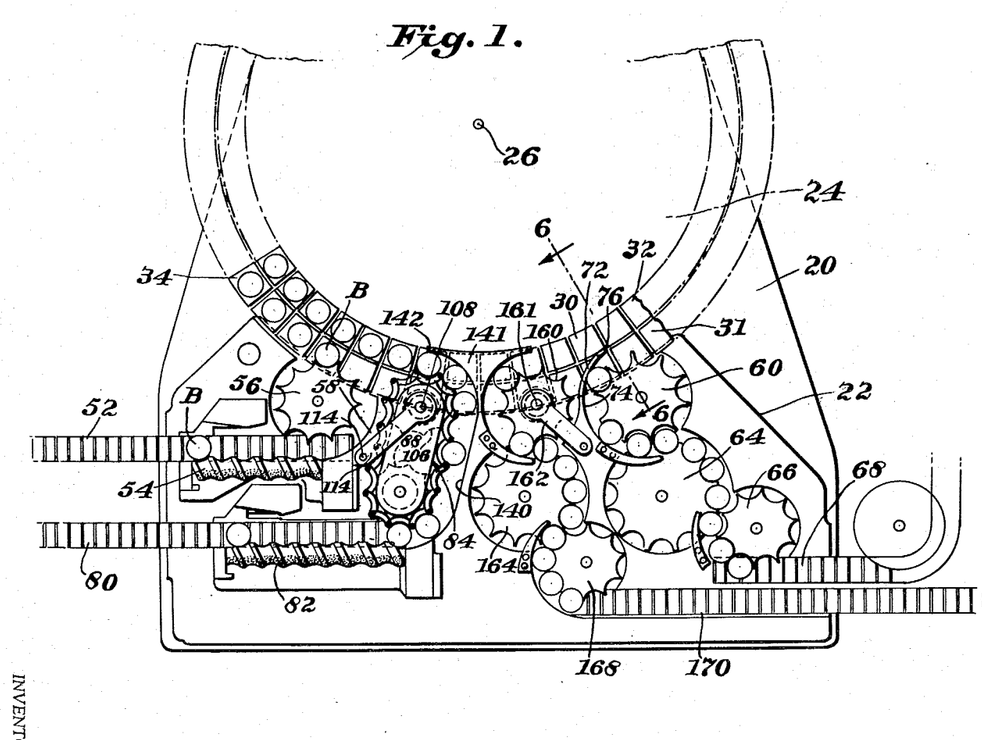
Figure 1 is a plan view of a rotary filling machine with the superstructure of the rotary filling table and some of the filling platforms omitted.

Referring to Figures 1 to 6, and particularly to Figure 1, the beverage filling machine there illustrated includes a base 20 having a stationary or work table 22 secured thereto. The rearward portion of base 20 has a rotary filling table 24 journalled thereon on a vertical axis diagrammatically indicated at 26 in Figure 1. It will be observed that the above-described components of the machine are similar to those disclosed in Robert J. Stewart and Wiltie I. Gladfelter Patent No. 2,202,033, issued May 28, 1940 for Filling Machine.

Figure 2:
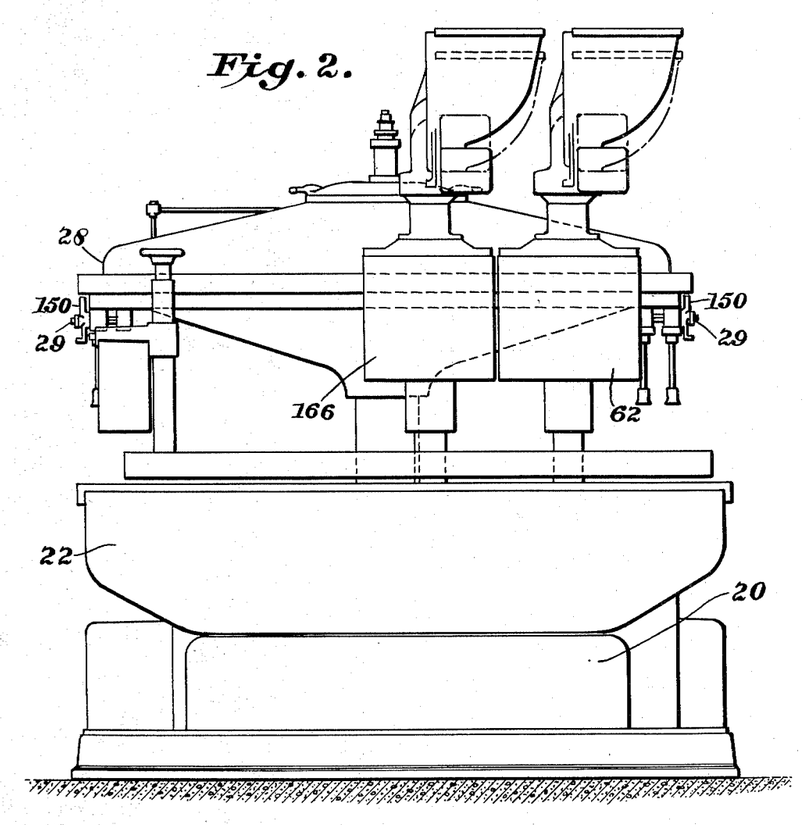
Figure 2 is a front elevation of the filling machine of Figure 1.
Figure 6:
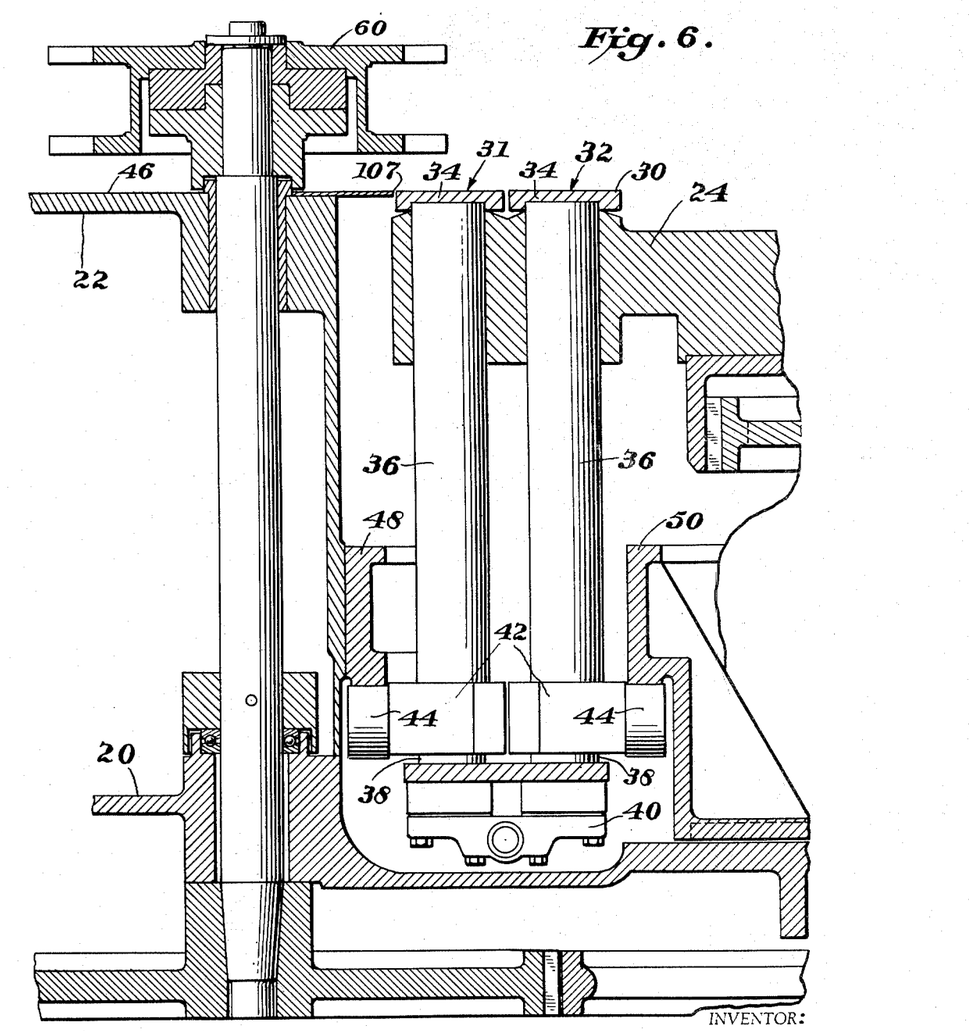
Figure 6 is a vertical section on the line 6—6 of Figure 1.

As best illustrated in Figure 2, the superstructure or reservoir containing portion 28 of the filling table 24 is provided adjacent its periphery with two concentric rows of filling heads generally designated 29. As shown in Figure 6, filling table 24 has a plurality of container supporting platforms or elements 30 vertically reciprocable in its peripheral edge portion, these platforms being arranged in an outer circular row 31 and an inner circular row 32, both rows being concentric with the axis 26 of filling table 24. Each platform 30 is of the general construction disclosed in said Stewart and Gladfelter patent in that it includes a container supporting plate 34 secured to the top of a cylinder 36 which is vertically reciprocable upon a tube 38 which is fixed at its lower end to a manifold 40 which is secured below the peripheral portion of the filling table 24 by vertical rods as disclosed in said Stewart and Gladfelter patent. As is also disclosed in said patent, on its lower end each cylinder 36 has a collar 42 secured thereto on which is mounted a roller or a cam engaging block of the type disclosed in the application of Carl L. Day and myself, Serial No. 260,968, filed December 11, 1951, for Filling Machine now Patent No. 2,699,282.

In accordance with the procedure described in said Stewart and Gladfelter patent, fluid will be maintained under pressure in the manifold 40 to thereby urge the cylinder 36 and remainder of each filling platform or container support 30 to a position raised above that shown in Figure 6 to thereby hold the bottles or other containers firmly in engagement with the filling heads 29. However, in accordance with usual practice, in order to enable filled containers to be removed from, and empty containers placed upon, the container supporting platforms 34, during the time that a container supporting element 30 is moving adjacent the stationary table 22, the rollers or blocks 44 of the platforms will be drawn downwardly to the position indicated in Figure 6 so that the platforms 34 will be flush with the upper surface 46 of the stationary table 22. Said above-mentioned patents disclose cams for the above purpose and the cams 48 and 50 illustrated in Figure 6 are of the type described in said patents. However, in order that the container supporting elements 30 of the outer row 31 will be movable independently of those of the inner row 32, two cams 48 and 50 are provided, cam 48 being fixed with respect to the base 20 of the machine outwardly of the outer row 31 of elements and the cam 50 to control the inner row 32 of elements being secured to base 20 inwardly of the inner row.

A principal reason for operating the platforms of the outer row 30 independently of those of the inner row 32 is because of the fact that glass beverage bottles constructed in accordance with even the most closely maintained tolerances still may vary in height. Therefore, two bottles would not necessarily both closely engage the sealing rings of two filling heads if both bottles were on one platform, so it is desirable to independently and separately move each bottle upwardly to obtain a proper seal between the mouth of the bottle and the filling head.

The manner of moving containers to and from the two concentric rows 31 and 32 of container supporting elements 30 is best illustrated in Figure 1. Referring to this figure and, more particularly, to the means for moving containers upon the outer row 31 of container supporting elements 30, a container infeed conveyor 52 of straight line type moves across the upper surface of stationary table 22 to thereby deliver the containers to a feed screw 54 of the type disclosed in Carl L. Day and Rudolph H. Breeback application for Article Feeding Mechanism, Serial No. 230,192, filed June 6, 1951. The feed screw 54 thereby causes the containers to be properly positioned with respect to an infeed dial 56 of usual type which is rotatable on the upper surface of the work table 22 in accordance with known practice. A guide plate 58 including a surface concentric with the dial 56 will guide containers moving with dial 56 from the outfeed end of feed screw 54 to a platform 34 of the outer row 31 of filling table container supporting elements 30.

It will be understood that the rotation of the filling table 24 will be so synchronized with respect to the infeed dial 56 that each container B moving with dial 56 will be properly centered on a platform 34 in a direction circumferentially of the filling table and also will be properly aligned with the filling tube or nozzle of the filling head 29 corresponding to that element 30.

As soon as a bottle B has been placed upon a platform 34, the continuous rotation of the filling table 24 will cause the platform controlling roller 44 (Figure 6) to move clear of the outfeed end of the platform controlling cam 48, so that the fluid pressure existing in the manifold 40 and the tubes 38 will force the element 30 upwardly as described in said Stewart and Gladfelter patent. The mouth of the bottle thereby will be brought into sealed relation with respect to the filling head 29. Immediately thereafter, the flow controlling element of the filling head, for example, a valve of rotary disk type, will be moved to connect the interior of the bottle with the upper and gas containing portion of the filling machine reservoir to thereby establish counterpressure in the bottle as described in said patent. Immediately thereafter, the filling head will be actuated to permit liquid to flow from the lower portion of the filling table reservoir while gas is returned from the bottle B to the upper portion of the reservoir so that the bottle will be filled to the desired level. By this time, the bottle will be closely adjacent the right-hand side (Figure 1) of the stationary table 22. At this point the stationary table 22 has an outfeed dial 60 rotatable thereon to remove bottles from the outer row 30 to platforms 34. In accordance with usual practice, dial 60 will move the bottles beneath the crowning heads of a crowning mechanism 62 which also includes a crowning dial 64. After the bottles have been crowned they will move about a transfer dial 66 which will position them upon a straight line conveyor 68 for removal from the machine.

It will be observed from Figure 1 that adjacent the outfeed dial 60, a stripper plate 72 projects from stationary table 22, plate 72 having a vertical height at least as high as that of the outfeed dial 60. The inner surface 74 of plate 72 is curved concentric with dial 60 and its inlet end 76 may be sharply pointed to thereby be clear of the path of bottles moving with the container supporting elements 30 of the inner row 32. Stripper plate 72 will cooperate with dial 60 to remove bottles from outer row 31. Guides of the usual form also will surround the dials 64 and 66 to insure that bottles properly will follow the course of those dials.

It will be observed from Figure 1 that the infeed dial 56 and outfeed dial 60 which move containers between the stationary table 22 and the outer row 31 of filling platforms 34 are spaced a substantial distance apart on the stationary table 22, this spacing being such that means may be positioned on table 22 between these two dials to move containers to and from the container supporting elements 30 of the inner row 32. The cams 48 and 50 are of sufficient length to hold the platforms 34 flush with stationary table 22 as the platforms came adjacent dial 60 and until they move clear of dial 56.

Figure 3:
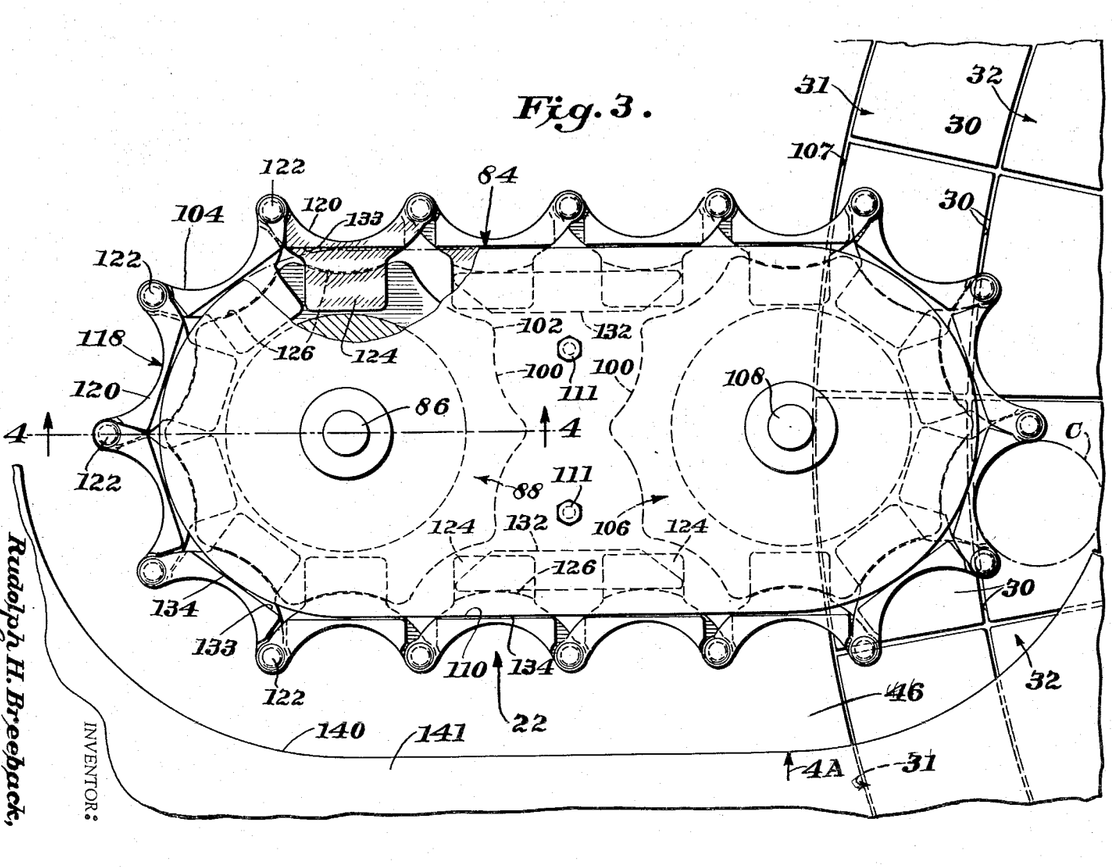
Figure 3 is a fragmentary view on a larger scale than Figure 1 showing the container infeed mechanism of the Figure 1 machine.
Figures 4, 5:
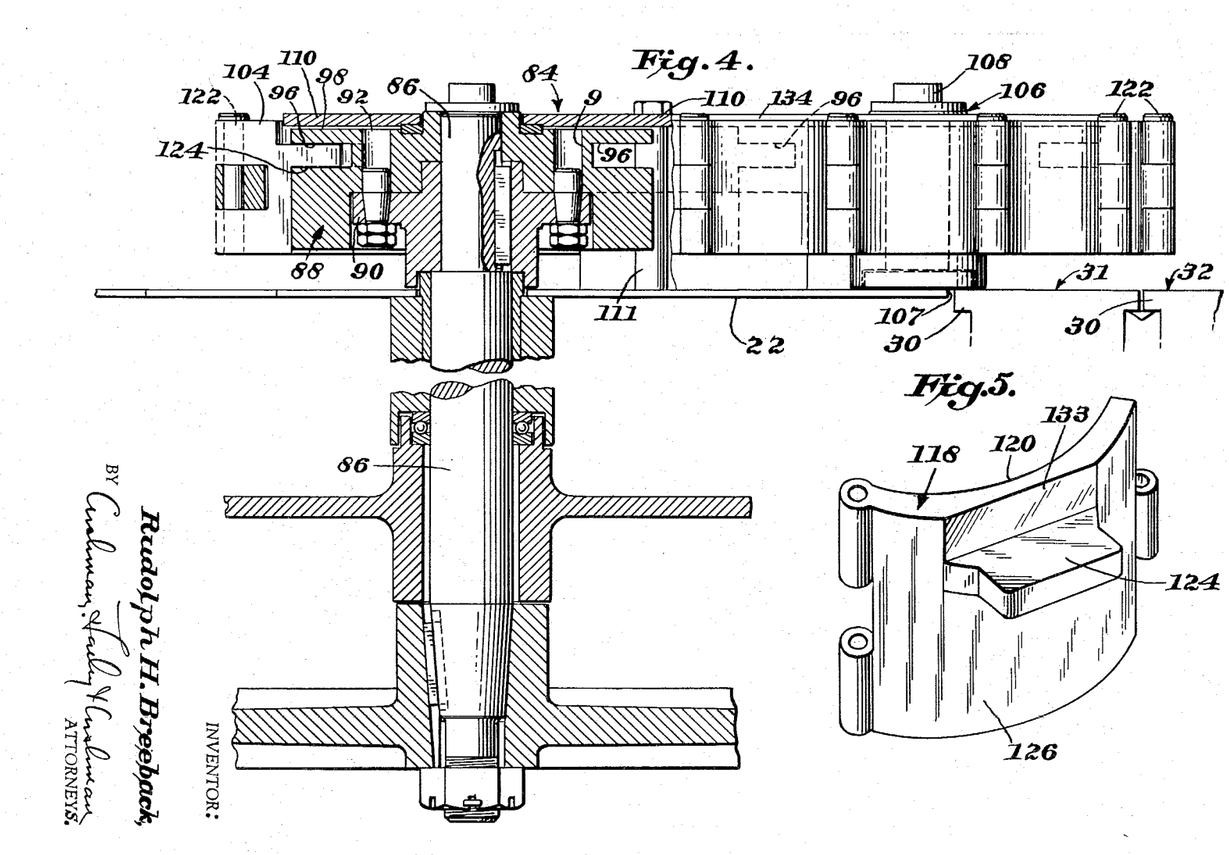
Figure 4 shows the Figure 3 structure partially in elevation and partially in vertical section, the left hand portion of Figure 4 being in section on the line 4—4 of Figure 3 and the right hand portion of Figure 4 viewing Figure 3 from the direction indicated by the arrow 4A of Figure 3.
Figure 5 is a perspective view of a container moving element included in the mechanism of Figures 3 and 4.

In general, it will be observed that the means used in Figures 1 to 6 to move containers to and from the inner row 32 is of such design that containers will slide across and upon the platforms of the outer row 31. In more detail, the mechanism to feed containers to the inner row 32 includes a conveyor 80 of straight line type which delivers bottles B to a feed screw 82 of the same type as the feed screw 54, feed screw 82 delivering the containers in properly spaced relation to a container infeed mechanism generally designated 84. The mechanism 84 is illustrated in plan in Figure 3 and also is illustrated in Figures 4 and 5.

Referring to Figure 3, mechanism 84 comprises a vertical shaft 86 extending above and journalled in and extending above the work table 22 and driven in synchronism with the filling table 24. Shaft 86 has a sprocket element 88 secured thereto, element 88 bearing upon a flange 90 keyed to shaft 86 and being held in properly timed position with respect to shaft 86, table 24 and dial 56 by means of pins 92 which extend upwardly from the flange 90 and into apertures 94 in the element 88.

As best indicated in Figure 4, sprocket element 88 is provided with an annular groove 96 extending about its periphery near its top surface 98. Also, the peripheral surface of sprocket element 88 is provided with shallow grooves or pockets 100 and interposed teeth 102 by means of which the element 88 drives a chain-like infeed element 104 as subsequently described. A second and similar sprocket element 106 is positioned above the edge 107 of work table 22, element 106 being an idler element rotatable about a stub shaft 108 which may be secured in and depend from a heavy top plate 110 which extends toward the filling table 24 from the shaft 86. Plate 110 can be secured to stationary table 22 by posts 111 positioned between the sprocket elements 88 and 106. In other words, idler sprocket 106 is journalled upon a stub shaft 108 which depends from the top plate 110. Alternatively, and as indicated in Figure 1, shaft 108 can be fixed in and extend downwardly from the inner end of an arm or bar 112 secured to a post 114 extending upwardly from the work table 22 at a point alongside the course of the infeed element 84. In any event, because the axis pin 108 or idler sprocket element 106 is closely adjacent the edge 116 of fixed table 22 and may even overhang the outer row 31 of elements 30, it is necessary to support shaft or pin 108 by an overhanging support.

The form and contour of idler sprocket element 106 is identical with that of the driven sprocket element 88 so that both may be engaged by the infeed chain 104. It will be understood that idler sprocket element 106, like driven sprocket element 88, may be removable with respect to the stationary table 22 to enable the mechanism to be replaced by one designed to handle another size of containers.

The container infeed element 84 is formed of a plurality of link elements 118 of the form best illustrated in Figure 5. Referring to this figure, as well as to Figures 3 and 4, it will be observed that each link element 118 includes a concave outer face 120 of such curvature as closely fit the round containers to be handled. If containers of other shape are to be handled, face 120 would be modified accordingly. Adjacent links 118 are adapted to be pivotally connected by hinge pins indicated at 122. On its inner face, each link 118 includes a horizontally extending lug 124 adapted to ride in the groove 96 of the sprocket elements 88 and 106, the lugs 124 thereby holding the links in the proper elevation with respect to the sprocket elements and the upper surface of the work table 22. Below its lug 124, each link 118 has its inner surface curved as indicated at 126 in both Figures 3 and 5 and this curved surface of each link is adapted to bear upon one of the concave surfaces 100 of the sprocket elements so that the sprocket chain or infeed element 104 is driven by sprocket element 88 and also drives idler element 106.

In order to hold the links 118 in a straight line during their movement from one sprocket element to the other, guide bars 132 may be suitably secured to the top plate 110 in such position that the inner surfaces of the links will bear thereon while moving from one sprocket element to the other. Also, the upper inner flat surface 133 of each link may slide on the peripheral edge 132 of plate 110. At the ends of plate 110, edge 134 is concentric with the shafts 86 and 108.

It will be perceived from the above that a bottle or other container outfed from feed screw 82 will be placed in the pocket 120 formed in a link 118 of the infeed element 104, it being clear that element 104 will be driven by shaft 86 so that its pockets 120 will be suitably synchronized with the outfeed of the feed screw 82 and also the movement of the filling table platforms. As shown in Figure 1, a container engaged by one of the pockets 120 will be held in the pocket by the edge 140 of a guide plate 141 fixed at proper height above the surface of stationary table 22.

As best shown in Figure 3, a container moving with infeed element 104 will slide across the top surface of the stationary table 22 and then across the platform 34 of a container supporting element 30 of the outer row 31 of filling table 24, such platform then being flush with table 22 and rotating beneath infeed element 84. As the container reaches a centered position on a platform 34 of the inner row 32, the continuing rotation of filling table 24 will carry the container clear of the outfeed end 142 of the stationary guide plate and the infeed element 104. Hence, the container now will stand upon a platform 34 of the inner row 32.

If desired, the platform controlling cam 50 (Figure 6) for the inner row 32 of platforms may be shorter than cam 48 to permit the inner row platforms to rise immediately after they clear element 84 and these platforms need not be lowered until they reach dial 160. At any rate, and as described in said Day and Breeback application, Serial No. 260,968, the mouth of bottles in each row quickly can be brought into a position to surround at least the lower end of the nozzle of a filling head 29 to thereby prevent the bottle from moving with respect to the platform 34 on which it is positioned. In any event, the platforms of the inner row 32 will be raised to bring the bottle into sealed relation with the corresponding filling head 29 in time to permit the bottle on each inner row platform to be counterpressured along with the bottle on the radially aligned platform 34 of the outer row 31.

As indicated in Figure 2 and as hereinafter described in connection with the arrangement of Figures 7 to 12, the two filling heads for each radial pair of container supporting elements 30 preferably are simultaneously actuated by a valve arm 150 (Figure 2) which engages the usual valve actuating trips spaced about the path of rotation of the filling table superstructure. Because both filling heads are simultaneously actuated, means preferably is provided to prevent the counterpressure trip from being effective to move a trip arm 150 unless both platforms 34 of a radial pair receive a bottle. In accordance with said Stewart and Gladfelter patent, a control of this sort can be effected by rendering the counterpressure trip ineffective if either of the platforms 34 of a radial pair rises to a greater extent than would be the case if the platform carried a bottle. In other words, as described in said patent, if a platform carries a bottle, the upward travel of the platform induced by the pressure in the manifold 40 will be limited by engagement of the mouth of the bottle with the filling head and advantage can be taken of this circumstance to thereby determine whether a counterpressure trip is to be actuated. As is also described in said patent, the remaining valve actuating trips can be so arranged that if a valve arm 150 is not moved to counterpressure position, the subsequent valve actuating trips will not move it to the other positions of the filling cycle.

Referring each to Figure 1, it will be observed that the bottles filled on the platforms 34 of the inner row 32 will be removed from those platforms by means of an outfeed dial 160 which is journalled on an overhanging bracket or bar 162 fixed to the stationary table 22. Dial 160 may be suitably driven by means of a sprocket chain or the like, not shown, so as to rotate in synchronism with the platforms 34 as well as the dial 164 of the crowning mechanism 166 for the inside row. It will be observed that an overhead support and chain drive must be provided for outfeed dial 160 because its supporting shaft may lie at least partially within the bounds of the filling table 24. Bottles crowned by the crowning mechanism 166 move to the transfer dial 168 which will position them upon a straight line outfeed conveyor 170 which will move the bottles from the machine.

It will be observed from the above that the machine of Figures 1 to 6 is operable to fill bottles or other containers positioned upon the filling table 24 in two concentric rows, the containers to be filled on the inner row 32 being moved across the platforms of the outer row 31. As indicated in Figure 6, the bottle supporting platforms 34 may be of the flush type with no bottle engaging brackets or holders thereon to hold the bottles against movement with respect to the platforms. However, if bottle holding brackets are found desirable, they may be provided in such way as to clear the dial 160, guide plate 141, and bottle infeed mechanism 84. In more detail, the guide plate 141 for the inner row 30 may be cut away to clear bottle holding brackets provided on the inner edges of the inner row platforms. Also, bottle holding brackets placed on the outer row 31 may be relatively low to thereby move beneath the outfeed dial 160, plate 141 and bottle infeed mechanism 84 which extend across the outer row 31 of platforms. Moreover, if desired, both holding brackets or means on the outer row 31 of platforms 34 might be telescopic with respect to the platforms so that they can be moved downwardly with respect to their platforms by means of a suitable cam fixed to the base of the machine adjacent cam 48. Such a cam could be effective to move the supports downwardly to clear dial 160, plate 141, and infeed conveyor 104 immediately after they have passed the outfeed dial 60, the brackets being raised again in time to receive a bottle from the infeed dial 56.

Figure 7:
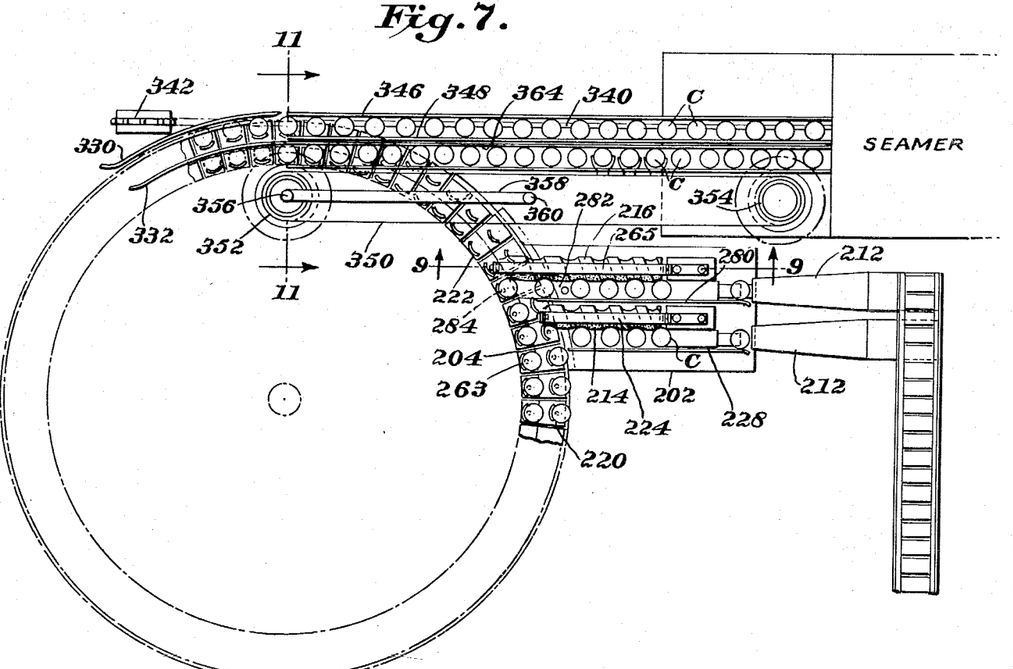
Figure 7 is a plan view of a modified form of filling machine, this view also omitting the superstructure of the rotary table and some of the filling platforms.
Figure 8:
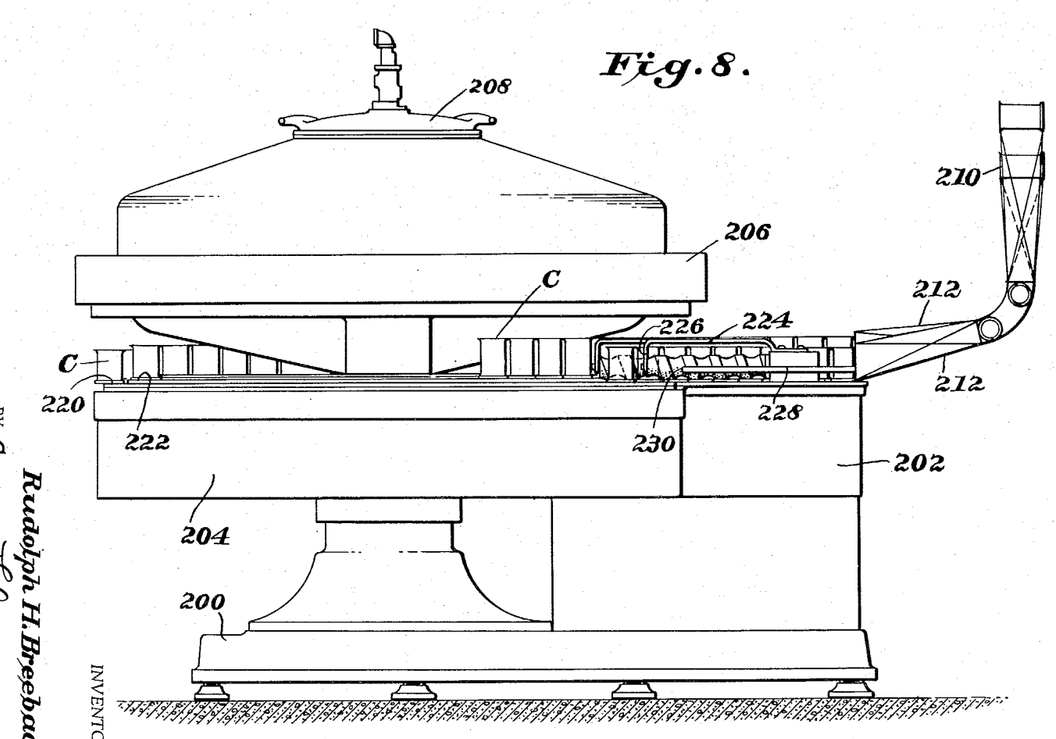
Figure 8 is a side elevation of the machine of Figure 7.

The machine shown in Figures 7 to 12 is particularly adapted for filling cans. Because metal cans such as provided for beer or other beverages can be manufactured to be highly uniform, a machine intended to handle two concentric rows of cans may be of slightly different construction from the machine heretofore described for handling two concentric rows of glass containers. As indicated in Figures 7 and 8, the filling machine of those figures may include a base 200 provided with a stationary table 202 and a rotary filling table 204 including a superstructure designated 206 provided with a reservoir 208, the filling table 204 being rotatable about a vertical axis on the base 200.

Cans to be filled may be delivered to the stationary table 202 through a pair of chutes generally designated 210, through which the cans move with their axes horizontal, the outlet portions of the chutes 210 being provided with orienting means 212 to twist the cans so that their axes will be vertical. The cans moving from the orienting devices 212 move to two spiral feed screws respectively designated 214 and 216, the feed screw 214 being positioned to place cans upon the outer row 220 of can receiving pockets or holders of the filling table and the screw 216 being provided to position cans upon the pockets of the inner row 222 of holders. Referring to the screw 214, this may be of the form generally disclosed in said Day and Breeback application for Container Feed Screws, to include a cylindrical element provided with a helical groove of gradually increasing pitch, the groove being of such form at the outfeed end of the element that the cans will be properly timed with respect to the rotation of the can supporting platforms of the filling table 204.

Feed screw 214 may be driven by gearing connected to its infeed end (rightfeed end in Figure 7), and its outfeed end may be supported by a bar 224 which extends horizontally above the screw and includes a depending strap 226 in which the outfeed end of the screw is journalled. It will be observed that such an overhanging support for the outfeed end of the screw is required because the screw extends over the rotary filling table 204. A fixed guide rail 228 extends above the table 202 to hold cans in engagement with the feed screw 241, the outfeed end 230 of guide rail 228 being so positioned with respect to the pockets of the outer row 220 that outfed cans will clear rail 228.

Figure 9:
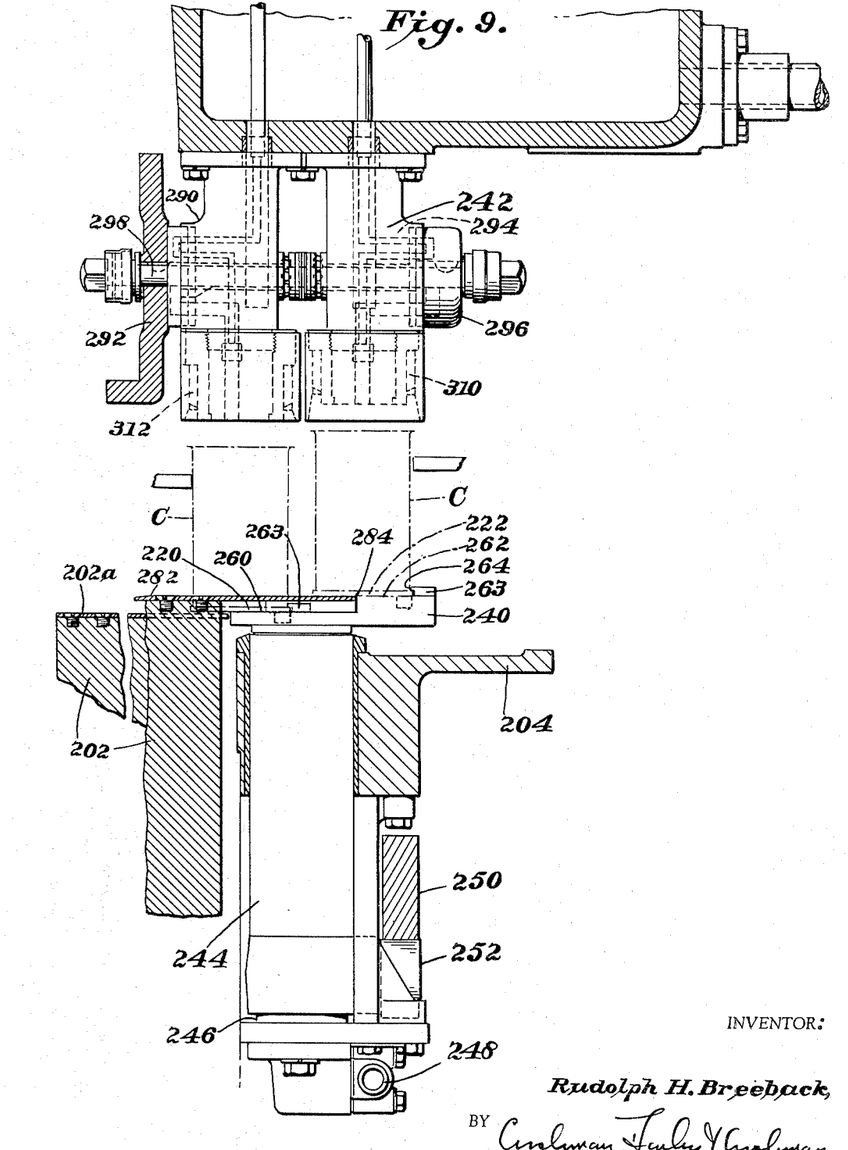
Figure 9 is a vertical sectional view on the line 9—9 of Figure 7, but with the feed screw omitted.

As best shown in Figure 9, the filling table 204 is provided with a single circular series of vertically reciprocable platforms 240, each of dual type in that each platform will support one can C in the outer circular row 220 and a second can C in the inner circular row 222, with both cans on a line extending radially of the filling table 204. Thus, the lifting of each platform 240 simultaneously will move two cans C upwardly into sealed relation with two filling heads 242. Because cans can be manufactured to a high degree of uniformity, both cans rising with a platform 240 will be perfectly sealed with respect to the dual filling head for the filling operation.

Each dual container supporting platform 240 is fixed to the upper end of a cylinder 244 vertically reciprocable in the peripheral portion of table 204 upon a tube 246 fixed to a fluid pressure manifold 248, all as described in said Stewart and Gladfelter patent. As indicated in Figure 9, at the time that a platform 240 is adjacent the fixed table 202, a roller or block 252 mounted at the lower end of the cylinder 244 will engage a cam 250 fixed to the base 200 of the machine to thereby move the platform downwardly to the position of Figure 9.

Figure 11:
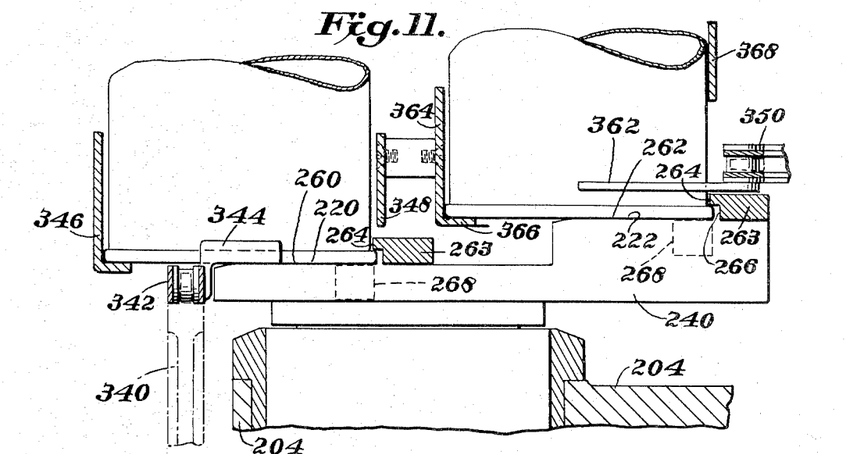
Figure 11 is an enlarged vertical section on the line 11—11 of Figure 7.

As is shown in Figures 9 and 11, each platform 240 is of stepped form so that the container C supported thereon in outer row 220 will stand on an outer and lower level 260 while the container in the inner row 222 will stand on a higher level 262. In practice, the upper level 262 need only be about half an inch higher than the lower level 260, because the difference in height need only be sufficient to enable the can holding brackets 263 of the lower level to move beneath the can infeed and outfeed means which move cans with respect to the upper level 262.

It will be noted from Figure 11 that the can holding brackets 263 of the inner and outer rows 222 and 220 are of identical form. In more detail, each bracket 263 is arcuate in plan, to provide an inner surface 264 to conform to the outer diameter of the can. Surface 264 of each bracket is undercut as indicated at 266 to fit and receive the lower seam of the can. A body of magnetic material 268 is positioned in a recess of the platform surface immediately adjacent both brackets 263, the magnet serving to hold the can firmly in the bracket and on the platform. It will be borne in mind that the magnetic action primarily is relied upon to hold the can centered while it is empty and before it is moved upwardly to be firmly engaged with the filling head 242. As is hereinafter described, after the can has been filled and lowered out of engagement with the filling head, it will contact suitable fixed guides which will further serve to hold it on the platform until the can reaches the outfeed means.

Referring again to Figure 7, it now will be clear that the infeed screw 214 which delivers cans to the outer row 220 of container brackets 263 will position each can firmly against a bracket 263 of the outer row and the magnet 268 associated with that bracket will further hold the can firmly in place until the can is lifted into engagement with the filling head 242. The cans C moving with feed screw 214 may slide directly upon the upper surface 202a of the stationary table 202 and because the lower and outer surface 260 of each platform 240 will be flush with the upper surface of the fixed table while that platform is moving adjacent the screw, screw 214 readily may position each can on the lower 260 of a platform 240.

The feed screw 216 which delivers cans to the inner row 222 of the brackets 263 of filling table 204 is sufficiently longer than the feed screw 214 to convey cans to the inner row of brackets. Screw 216 is supported in the same manner as screw 214, viz., by means of an overhead bracket 265. The cans moving with screw 216 will be held against the screw by a fixed guide 280 and will slide upon a plate 282 best shown in Figure 9 which is sufficiently higher than the can supporting surface associated with screw 214 to be flush with the upper and inner surface 262 of each platform 240 when the lower can supporting surface 260 is flush with the surface 202a of table 202. As indicated in Figure 7, the outfeed end 284 of plate 282 will lie closely adjacent the outer edge of the upper can supporting surfaces 262 so that a cam smoothly may move from the plate 282 to the upper platform surface 262. As indicated above, the bracket 263 and magnet 268 of each upper platform surface firmly will hold the empty can in place until it is raised into engagement with the filling head.

Figure 10:
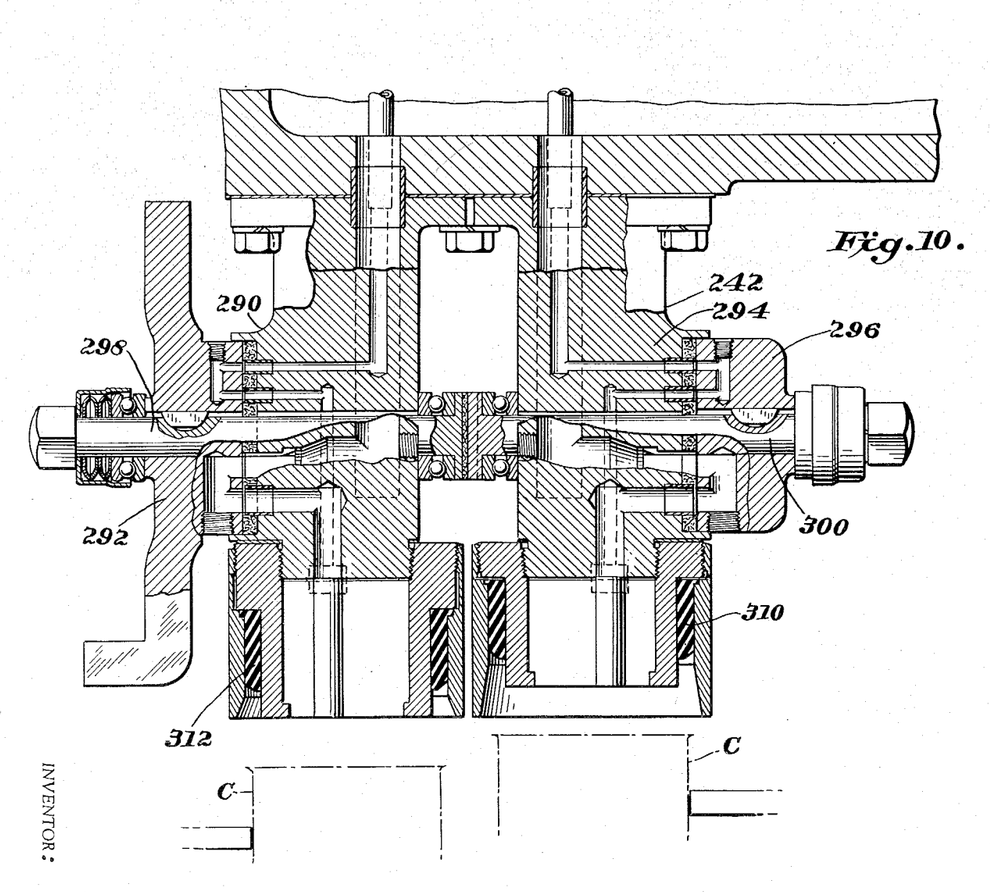
Figure 10 is an axial section through the filling head included in Figure 9 with portions being in section in other planes.

The filling heads 242 used for filling cans are of dual type and are illustrated in Figures 9 and 10 and may be of the same type as those used with the machine of Figures 1 to 6 but are provided with container engaging means of a type suitable for use with cans. For example, a can engaging seal of the type disclosed in Carlton W. Bondurant Patent No. 2,082,534, issued June 1, 1937, for Apparatus for Filling Liquid Receptacles may be provided on each filling head. As shown in Figures 9 and 10, the two units of each dual head 242 may be rotary disk type, the outer unit 290 including a rotary disk valve 292 on its outer face and the inner unit 294 being provided with a rotary disk valve 296 on its inner face. The shafts 298 and 300 of the two heads may be coaxial and suitably connected so that both disk valves 292 and 296 simultaneously can be operated to successive filling positions by a counterpressure trip, filling trip and closing trip spaced in the path of movement of a pair of valves between the infeed screw 214 and the means hereinafter described for removing cans from a platform.

It will be understood that means responsive to the presence of cans on both levels of a platform may be provided to insure that neither of the valves 292 or 296 will be actuated unless both levels of platforms have cans thereon. However, if desired, a removable or releasable connection may be provided between the end of the shaft 300 of each inner unit and the adjacent end of the shaft 302 of its outer unit 290. With such an arrangement, and with the container deflecting means made responsive to only the outer row, cans may be filled only on the outer row 220.

As appears in Figure 10, the sealing ring 310 of the innermost row of filling units 294 will be mounted somewhat higher in the head than is the case with the sealing ring 312 of the outer units 290, the vertical positioning of the two sealing rings being varied according to the spacing between the two levels 260 and 262 of the platforms 240. In other words, while the valves 292 and 296 are positioned on a common level and coaxial, the can engaging portion of each filling head and such elements as control filling height must be so positioned with respect to the respective can supporting surfaces that each can will fill to the proper height.

Figure 12:
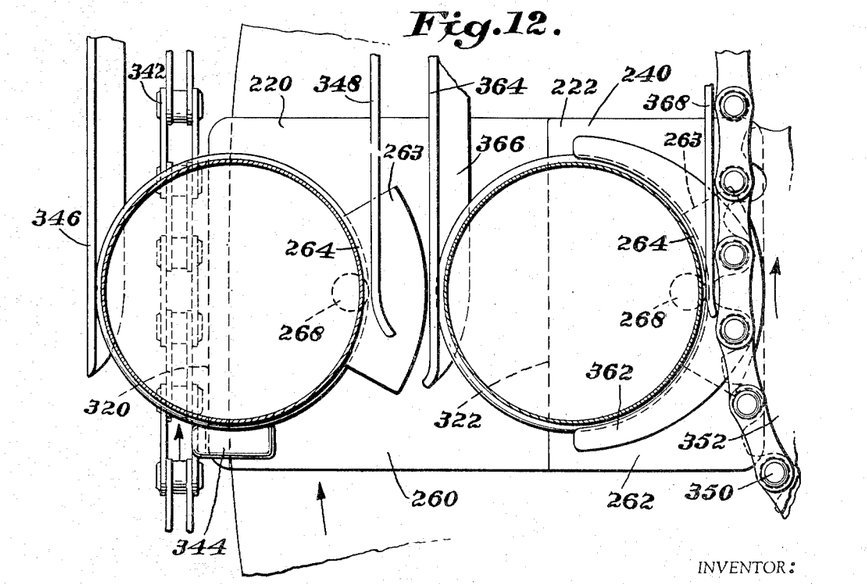
Figure 12 is a fragmentary plan view of the structure shown in Figure 11.

As has been mentioned above, each platform 240 includes a lower or outer can supporting surface 260 and an upper and inner can supporting surface 262, each surface being provided with a can holder 263. As best shown in Figures 11 and 12, the holder 263 of each lower and outer surface is so positioned with respect to the outer edge 320 of platform 240 that a can in engagement with the outer holder 263 will project beyond edge 320 of the plate; in fact, edge 320 may lie only about a quarter of an inch outwardly of the axis of the can. The outer edge 322 of the upper and inner surface 262 of each platform 240 may be correspondingly spaced from the holder 263 of the upper surface. As has been mentioned above, the provision of the magnets 268 in each of the can supporting surfaces adjacent its holder 263 insures that an empty can will remain in proper position on a platform until the mouth of the can is brought into engagement with the sealing rings 310 or 312 of the filling heads and after a can is engaged with the filling heads, they cannot move with respect to the platforms.

When the cans have been filled and just before the platforms lower to move the cans out of engagement with the filling heads, the outer periphery of the outermost row of cans will come into engagement with a guide or retainer strip 330 fixed to the base 200 of the machine, this retainer preferably being of angled form in cross section to provide a narrow horizontal flange on which the outer edge of the can bottom may ride and an upstanding flange to insure that the can will remain closely engaged with its holder 263. Retainer strip 330 may be downwardly inclined in conformity with the adjacent end of the platform controlling cam 250 of Figure 9. A similar retainer strip 330 also will be provided to retain the inner row of cans in proper position on the surfaces 262 and holders 263 when the platforms lower. Strip 332 may be supported by guide elements discussed immediately below which assist in removing the cans from the filling table.

In order to remove the outer row of cans from filling table 204, an endless sprocket chain 340 is provided, chain 340 moving about a sprocket wheel 342 diagrammatically shown in Figure 7 to thereby move in a vertical plane extending tangentially with respect to the filling table 204. The upper run 342 of the chain 340 will have its upper surface flush with the surface 260 on which the outer row 220 of cans is supported and also will lie closely adjacent the edge of the table 204 so that as each platform 240 moves past a radial line such as 11—11 of Figure 7, at least a portion of the can which overhangs the platform edge 320 will rest upon the chain. Chain 340 has can engaging shoes 344 spaced along the same in synchronism with the platforms 240 and, as shown in Figure 12, a shoe 344 will move into engagement with the trailing side of a can as the latter reaches the radial line 11—11 of Figure 7. At the same instant, the outer and bottom edge of the can will reach an angled strip 346 of much the same cross section as the retainer strip 330 and the inner wall of the can will contact with a stripper guide 348. The stripper 348 will remove the can from the holder 263 and platform surface 260 and will cause the can to move with the conveyor chain shoe 344 along the guide plate 346. As appears in Figure 7, the conveyor chain 340 thereby will carry the can to a seamer which may be located closely adjacent the stationary table 202. Chain 340 may be driven at its can outfeeding end.

The inner row of can supported on the platform levels 262 are adapted to be removed by a link chain 350 which moves in a horizontal plane about horizontally arranged sprocket wheels 352 and 354. Sprocket wheel 354 may be fixed to a vertical shaft journaled adjacent the seamer and sprocket wheel 352 may be journalled on an idler shaft 356 supported at the inner end of a supporting arm 358 which extends horizontally inwardly between the filling table platforms and the filling table superstructure from a post 360 extending upwardly from the base 200 of the machine, arm 358 thereby clearing the platforms and filling heads.

As best shown in Figures 11 and 12, the chain 350 has semicircular can engaging brackets 362 fixed thereto and so spaced apart as to be synchronized with the can holders 263 of the inner row 222 of can supporting surfaces of the platforms 240. As shown in Figure 11, chain 350 moves in a horizontal plane slightly above the plane in which the upper can holders 263 move and the cans engaged by the chain carried holders 362 will have their outer surfaces in contact with a fixed guide strip 364 which extends parallel to the stripper plate 348 provided for the outer row of cans. Because supporting plate 364 is angled in section to include a flange 366 which will extend beneath the lower and outer portion of the can, the can will be firmly supported. A stripper plate 368 extending above the outer run of chain 350 will assist the chain in stripping a can from the upper level 262 of a platform 240 and also will hold the can upright on the outer supporting flange 366 of guide plate 364.

It will be perceived that the arrangements illustrated in Figures 11 and 12 insure that filled cans rapidly can be removed from both levels of the platforms 240 and the can thereby conducted to a seamer.

It will be obvious that all of the container handling elements of both forms of machine must be operated in synchronism with each other and the rotation of the filling tables 24 and 204. For example, the infeed screws 214 and 216 of Figure 7 must be so designed and operated that they will position a can at a holder 263 in perfect synchronism with the rotation of table 204.

The terminology used in the specification is for the purpose of description, and not of limitation, the scope of the invention being indicated by the claims.

I claim:

1. In a filling machine, a base, a filling table rotatable on said base about a vertical axis, stationary table means fixed to said base adjacent said filling table, means to support containers on said filling table in two circular rows concentric with the axis of rotation of said filling table, and means to move containers in two rows from said stationary table means to said container supporting means.

2. A filling machine of the character described in claim 1 wherein the means to move containers from said stationary table means operates to simultaneously move containers along two separate paths.

3. A filling machine of the character described in claim 1 wherein the means to move containers operates to simultaneously move containers along two separate paths extending substantially radially of the filling table.

4. A filling machine of the character described in claim 1 wherein said means to support containers includes a plurality of vertically reciprocable container supporting platforms arranged to support pairs of containers on substantially parallel lines.

5. A filling machine of the character described in claim 1 wherein said means to support containers includes a plurality of vertically reciprocable container supporting platforms arranged to support pairs of containers on substantially parallel lines with one container higher than the other.

6. A filling machine of the character described in claim 1 wherein said means to support containers includes a plurality of vertically reciprocable container supporting platforms arranged to support pairs of containers on lines extending substantially radially of the filling table.

7. A filling machine of the character described in claim 1 wherein said means to support containers includes a plurality of vertically reciprocable container supporting platforms arranged to support pairs of containers on substantially parallel lines, and two circular rows of filling heads supported on the filling table above the platforms.

8. A filling machine of the character described in claim 1 wherein said means to support containers includes a plurality of vertically reciprocable container supporting platforms arranged to support pairs of containers on substantially parallel lines, and two circular rows of filling heads supported on the filling table above the platforms, a filling head being vertically aligned with each means to support a container.

9. A filling machine of the character described in claim 1 wherein said means to support containers includes a plurality of vertically reciprocable container supporting platforms arranged to support pairs of containers on lines extending substantially radially of the filling table, two circular rows of filling heads supported on the filling table above the platforms, the filling heads of the two rows being arranged in pairs with the respective pairs positioned on lines extending substantially radially of the filling table and in vertical alignment with the respective container supporting means.

10. A filling machine of the character described in claim 1 wherein said means to support containers includes a plurality of vertically reciprocable container supporting platforms arranged to support pairs of containers on lines extending substantially radially of the filling table, two circular rows of filling heads supported on the filling table above the platforms, the filling heads of the respective rows being arranged in tandem pairs so that each pair includes two heads positioned on a line extending substantially radially of the filling table, the heads of each pair including movable flow controlling elements, and means in the path of movement of the heads of one of the circular rows to actuate the heads of a pair.

11. A filling machine of the character described in claim 1 wherein said means to support containers includes a plurality of vertically reciprocable container supporting platforms arranged to support pairs of containers on substantially parallel lines, two circular rows of filling heads supported on the filling table above the platforms, and means responsive to the presence of a pair of containers beneath two adjacent filling heads to control operation of said two filling heads.

12. A filling machine of the character described in claim 1 wherein said means to support containers in two concentric rows supports the inner row of containers at a higher level than the outer row, said means to move containers to said container supporting means comprises separate container moving mechanisms for the respective concentric rows, the mechanism to move containers to the inner row being movable above and across the area on which the outer row may be formed.

13. In a filling machine, a base, a filling table rotatable on said base about a vertical axis, stationary table means fixed to said base adjacent said filling table, means to support containers on said filling table in inner and outer rows concentric of the axis of rotation of said filling table, means to move containers from said stationary table means to said outer row of supporting means, means carried by said stationary table means and spaced along the path of rotation of said filling table from said last-named container moving means to move containers from said outer row of supporting means to said stationary table, and means positioned between said two container moving means to move containers to and from said inner row of supporting means.

14. In a filling machine, a base, a filling table rotatable on said base about a vertical axis, means to support containers on said filling table in circular rows concentric of the axis of rotation of said filling table with a container of one row and a container of another row in alignment radially of said table, valved filling means on said table above said container supporting means, and means to move radially aligned containers vertically with respect to said table to engage said filling means.

15. In a filling machine, a base, a filling table rotatable on said base about a vertical axis, means to support containers on said filling table in circular rows concentric of the axis of rotation of said filling table with a container of one row and a container of another row in alignment radially of said table, valved filling means on said table above said container supporting means, and means to simultaneously but independently move radially aligned containers vertically with respect to said table to engage said filling means.

16. In a filling machine, a base, a filling table rotatable on said base about a vertical axis, means to support containers on said filling table in circular rows concentric of the axis of rotation of said filling table with a container of one row and a container of another row in alignment radially of said table, conveyor means movable tangentially of said table to engage and remove a container from one of said rows.

17. In a filling machine, a base, a filling table rotatable on said base about a vertical axis, means to support containers on said filling table in circular rows concentric of the axis of rotation of said filling table with a container of one row and a container of another row in alignment radially of said table, conveyor means to engage and remove a container from one of said rows, said conveyor means being movable along a line which lies within opposed bounding planes of the container to be engaged thereby.

18. In a filling machine, a base, a filling table rotatable on said base about a vertical axis, means to support containers on said filling table in circular rows concentric of the axis of rotation of said filling table with a container of one row and a container of another row in alignment radially of said table, a plurality of endless conveyor means to engage and remove containers from said rows, one of said conveyor means being movable in a vertical plane and the other being movable in a horizontal plane.

19. In a filling machine, a base, a filling table rotatable on said base about a vertical axis, means to support containers on said filling table in a circular row comprising a horizontal platform including an edge facing radially outwardly of said table, means to locate a container on said platform with a portion of the container extending outwardly past said edge, and means movable in a plane lying between said platform edge and the outermost portion of said container to remove the container from said platform means.

20. In a filling machine, a base, a filling table rotatable on said base about a vertical axis, stationary table means fixed to said base adjacent said filling table, container supporting means on said filling table in inner and outer circular rows concentric with the axis of rotation of said filling table, said outer row of supporting means being in a plane lower than the inner row, means on said stationary table to move containers between the filling table outer row supporting means and said stationary table, and means movable across said outer row supporting means to move containers between said inner row supporting means and said stationary table.

21. In a filling machine, a base, a filling table rotatable on said base about a vertical axis, platform means to support containers on said filling table in a circular row concentric with its axis of rotation, stationary table means on said base alongside said filling table, container transfer means extending from said stationary table and immediately above the path of movement of said platform means with said filling table, means on said platform means to engage and hold a container in position on said platform means, said last-named means being movable with said platform means and said container transfer means to clear the latter during rotation of said filling table.

22. In a filling machine, a base, a filling table rotatable on said base about a vertical axis, means to support containers in two circular rows on said table, two concentric rows of filling heads on said table above said supporting means, each filling head being in vertical alignment with a means to support a container, a filling head of one row being positioned in radial alignment with a filling head of the other row to form a pair, the filling heads of each pair being selectively connectable for simultaneous operation for filling flow.

23. A filling machine of the character described in claim 1 wherein said means to move containers in two rows from said stationary table means to said container supporting means includes separate container moving mechanisms for the respective concentric rows, the mechanism to move containers to the inner row being movable above and across the area on which the outer row may be formed.

24. A filling machine of the character described in claim 23 wherein the mechanism to move containers to the inner row is a flexible conveyor means movable in a horizontal orbit.

25. A filling machine of the character described in claim 23 wherein the mechanism to move containers to the inner row is a flexible endless conveyor having container engaging pockets and movable in a horizontally disposed orbit, said endless conveyor being supported at its outfeed end by an overhanging support extending from said stationary table.

26. A filling machine of the character described in claim 12 including a flat plate extending horizontally from said stationary table means over the means to support containers in the outer row and beneath the mechanism to move containers to the inner row, said flat plate having its upper surface level with the surface of the means to support containers on the inner row.

References Cited in the file of this patent

UNITED STATES PATENTS

| | | |
|---|---|---|
| 1,460,211 | Nicholas et al. | June 26, 1923 |
| 1,612,811 | Hansen | Jan. 4, 1927 |
| 1,796,279 | Berg | Mar. 17, 1931 |
| 2,158,768 | Ayars | May 16, 1939 |
| 2,315,866 | McBean | Apr. 6, 1943 |

FOREIGN PATENTS

| | | |
|---|---|---|
| 509,793 | France | Nov. 19, 1920 |